United States Patent
Arai et al.

(10) Patent No.: US 6,918,165 B2
(45) Date of Patent: Jul. 19, 2005

(54) METHOD FOR MANUFACTURING A MULTI-LAYER CAPACITOR

(75) Inventors: Koji Arai, Nara (JP); Yuichiro Yamada, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 5 days.

(21) Appl. No.: 10/437,295

(22) Filed: May 14, 2003

(65) Prior Publication Data

US 2004/0012910 A1 Jan. 22, 2004

(30) Foreign Application Priority Data

May 15, 2002 (JP) ........................................ 2002-140527

(51) Int. Cl.$^7$ ................................................ H01G 7/00
(52) U.S. Cl. ........................ 29/25.42; 29/417; 29/592.1; 257/306; 257/310; 257/528; 257/532; 361/301.1; 361/302.2; 361/301.4; 361/309; 361/311; 427/9; 427/559; 427/585; 438/239; 438/386; 438/393
(58) Field of Search ............................. 29/25.42, 592.1, 29/417; 427/9, 559, 585; 438/239, 386, 393; 361/301.1, 302.2, 301.4, 309, 311; 257/306, 310, 528, 532

(56) References Cited

U.S. PATENT DOCUMENTS

| | | | | |
|---|---|---|---|---|
| 4,959,748 A | * | 9/1990 | Kimura et al. | ............... 361/323 |
| 5,043,843 A | * | 8/1991 | Kimura et al. | ............ 361/308.1 |
| 5,125,138 A | | 6/1992 | Shaw et al. | ................. 29/25.42 |
| 6,576,523 B1 | * | 6/2003 | Honda et al. | ................ 438/381 |

FOREIGN PATENT DOCUMENTS

| JP | 11-147279 | | 6/1999 | |
|---|---|---|---|---|
| JP | 2000003830 A | * | 1/2000 | ............ H01G/4/30 |

* cited by examiner

Primary Examiner—Paul D Kim
(74) Attorney, Agent, or Firm—Wenderoth, Lind & Ponack, L.L.P.

(57) ABSTRACT

A multi-layer capacitor is highly downsized and increased in capacity. A method for manufacturing the multi-layer capacitor includes, in the same vacuum chamber, forming a dielectric layer, treating a surface of the dielectric layer, forming a pattern in a metal electrode, forming the metal electrode on the dielectric layer, and treating a surface of the metal electrode. In this method, etching of the dielectric layer flattens a recessed part generated by an electrical insulation part.

16 Claims, 6 Drawing Sheets

METHOD FOR MANUFACTURING A MULTI-LAYER CAPACITOR

FIELD OF THE INVENTION

The present invention relates to a multi-layer capacitor formed of a dielectric layer and a metal thin film layer, and a method for manufacturing the capacitor.

BACKGROUND OF THE INVENTION

Recently, all electronic components including a capacitor have been urgently required to be downsized and increased in performance. Capacity of the capacitor is proportional to an area of an electrode plate and is inversely proportional to a distance between electrodes. At this time, a thickness of a dielectric is equal to the distance between the electrodes. When dielectrics have the same dielectric constant, for increasing capacity of the capacitor, the area of the electrode plate needs to be increased or the dielectric layer needs to be thinned. In other words, for downsizing the capacitor and simultaneously maintaining or increasing the capacity thereof, it is effective to thin the dielectric layer and increase an effective area of the electrode plate. As a laminated body that is formed of the dielectric layer and the metal thin film layer, and is used as a capacitor or the like, a film capacitor is known. Structure of the film capacitor is described below. A metal thin film made of aluminum or the like is firstly formed on a resin film during a vacuum deposition method or a sputtering method. The resin film is made of polyester (for example, PEN or PET), polyolefin (for example, PP), or PPS. Metal thin films manufactured from such a method are laminated or wound, thereby forming a film capacitor. The resin film functions as a dielectric. In this case, constraint in manufacturing the film limits thinning of the resin film. A minimum thickness of a film for a presently used film capacitor is about 1.2 $\mu$m. For further increasing capacity of the capacitor, an effective area of the dielectric needs to be increased, namely a number of laminations and a number of turns need to be increased. However, simultaneous downsizing and capacity increase of the film capacitor causes a limit to be reached. U.S. Pat. No. 5,125,138 discloses a multi-layer capacitor in which a laminated body is formed of a dielectric layer and a metal thin film layer, with a thickness of the dielectric layer being about 1 $\mu$m. The dielectric layer is formed by polymerizing a reactive monomer. Japanese Patent Unexamined Publication No. H11-147279 discloses a chip capacitor having a dielectric layer formed by polymerizing a reactive monomer. FIG. 6 is a sectional view showing a structure of a conventional multi-layer chip capacitor.

In FIG. 6, internal electrodes 11 and dielectric layers 12 are sequentially laminated, and electrical insulation part 13 exists in each internal electrode 11 every two layers. External electrodes 41 are finally formed to constitute a multi-layer chip capacitor as a product. Electrical insulation parts 13 are provided for forming a capacitor. Electrical insulation parts 13 function for preventing a short circuit and increasing an effective area of dielectrics in a capacitor forming part.

Electrical insulation parts 13 have no metal layer, so that uneven parts occur in the capacitor in response to an increase of a number of layers. This state is shown in the enlarged view of electrical insulation parts 13 of FIG. 7. When the number of layers exceeds 1000, electrical insulation parts 13 can be deeply recessed as shown in FIG. 8. In such a case, each internal electrode 11 is disconnected or internal electrodes 11 are short-circuited, thereby damaging function as a capacitor. This problem can be further noticeable when a thickness of the dielectric layers is decreased to a thickness unachievable in a conventional film capacitor. The present invention aims to essentially address the problem occurring in achieving downsizing or high capacity of a capacitor. An improvement of productivity is also one purpose of the present invention.

SUMMARY OF THE INVENTION

The present invention provides a multi-layer capacitor in which a plurality of dielectric layers and metal electrode layers are sequentially laminated. Metal electrode layers alternately have an electrical insulation part. The dielectric layers cover and flatten recessed parts in the metal electrode layers produced by the electrical insulation parts.

The present invention provides a method of manufacturing the multi-layer capacitor. The method comprises the following:

a monomer deposition process of forming a dielectric layer on a surface of a can roller rotating in a constant direction in a vacuum chamber;

a patterning process of supplying patterning material to a part of the dielectric layer that corresponds to an electrical insulation part and lies on a surface of the dielectric layer, and forming the electrical insulation part;

a metal deposition process of forming a metal electrode layer on a surface of the dielectric layer except for the electrical insulation part; and a flattening process of flattening a recessed part generated by the electrical insulation part of a laminated body that is formed by repeating the procedures discussed above.

DETAILED DESCRIPTION OF THE PREFERRED EMBODIMENTS

Exemplary embodiments of the present invention will be hereinafter described with reference to the accompanying drawings. The accompanying drawings are pattern diagrams and do not show respective positions in accurate size.

Figure 1:
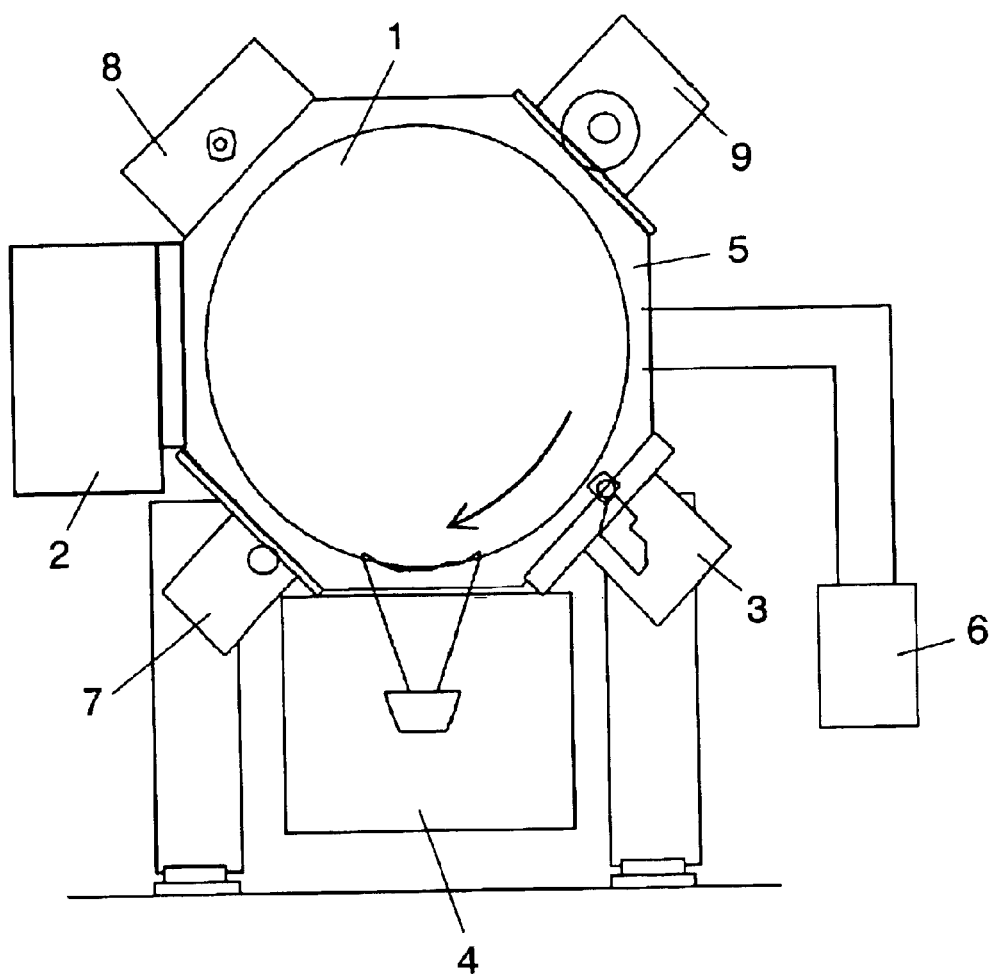
FIG. 1 shows a manufacturing apparatus of a multi-layer capacitor of the present invention.

FIG. 1 shows a manufacturing apparatus of a multi-layer capacitor of the present invention. Metal deposition source 4 is disposed under can roller 1 that rotates in the arrow direction in FIG. 1 at a constant angular velocity or a constant circular velocity. Metal electrode surface treating unit 7, monomer evaporation source 2, curing unit 8, resin surface treating unit 9, and patterning material supplying unit 3 are disposed sequentially in a rotational direction of can roller 1 from a downside thereof. These units are engaged with vacuum chamber 5, and an interior of the chamber is maintained in a vacuum via vacuum pump 6. An outer peripheral surface of can roller 1 is finished smoothly and specularly, and preferably cooled to −20 to 40° C., especially preferably to −10 to 10° C. A rotational speed can be set arbitrarily, but is preferably within a range of 15 to 70 rpm. Metal deposition source 4 has a shutter (not shown) facing the outer peripheral surface of can roller 1 so as to control an interval of metal deposition. A metal electrode layer is thus formed on a surface of a dielectric layer. As the metal for the deposition, at least one selected from a group of Al, Cu, Zn, Sn, Au, Ag, and Pt, for example, is employed. This metal electrode may be formed via a sputtering method or the like instead of a vacuum deposition method. Metal electrode surface treating unit 7 performs an improving treatment of adhesiveness between a metal electrode surface and a dielectric resin layer. For example, titanium atoms are deposited on a metal electrode surface during the sputtering method or the vacuum deposition method. A chemical bond of metal (electrode)-Ti-carbon (resin) is formed as a result.

Adhesiveness between resin and metal can be thus improved. A similar effect can be obtained also via a chemical vapor deposition (CVD) method using $TiCl_4$ or the like as raw material. When coupling material is added to the metal electrode, the coupling material segregates on an interface between the metal and the dielectric with heat treatment performed during a subsequent process of forming a laminated body. A chemical bond similar to that discussed above can therefore be obtained and adhesiveness can be improved. When light energy equivalent to polymerizing energy of a reactive monomer is radiated, bonding of a polymerization starting part is broken and a chemical bond of metal—carbon (resin component) is formed. An effect similar to that in a case where the coupling material is deposited on the metal surface can therefore be obtained. Monomer evaporation source 2 evaporates and vaporizes a reactive monomer toward the outer peripheral surface of can roller 1. A shutter (not shown) is disposed so as to control a deposition interval of the reactive monomer onto can roller 1. The reactive monomer is deposited, and finally a dielectric layer is formed. This deposited reactive monomer is polymerized or cross-linked by curing unit 8 to form a resin thin film having a desired degree of cure. A polymerization initiator can be used additionally if necessary. As curing unit 8, for example, a radiating device of electron beams or ultraviolet rays is used. A resin thin film cured by curing unit 8 is surface-treated by resin surface treating unit 9. For example, an oxygen plasma treatment or the like activates a resin surface. Adhesiveness to the metal thin film can therefore be improved. Patterning material supplying unit 3 deposits patterning material onto a surface of the resin thin film in a band shape. No metal thin film is formed in a place having deposited patterning material, and this place forms an electrical insulation part in the laminated body. A laminating position of the electrical insulation part is preferably displaced from a laminating position of an electrical insulation part in an adjacent layer unit. As the patterning material, for example, oil or paraffin can be employed. For supplying the patterning material, it is preferable to use a method of jetting evaporated and vaporized patterning material from a nozzle and liquefying it on the surface of the resin thin film. A predetermined number of layers including the resin layer and the metal layer are laminated onto the outer peripheral surface of can roller 1, in the method discussed above. Here, the metal layer is laminated onto a part other than a band-like electrical insulation part. A cylindrical continuous body is thus formed. The continuous body is radially divided, for example, into eight parts every 45°, and removed from the can roller. Each divided body is then heated and pressed, thereby providing a flat parent element of the laminated body. The parent element is then cut to provide a laminated body in accordance with the manufacturing method of the present invention. According to the method discussed above, a laminated body can be manufactured efficiently and inexpensively by a simple method.

(Exemplary Embodiment 1)

Figure 2A:
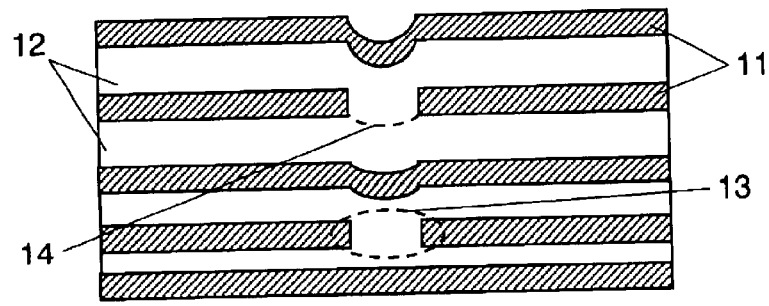
FIG. 2A to FIG. 2C show a manufacturing process in accordance with exemplary embodiment 1 of the present invention.
Figure 2B:
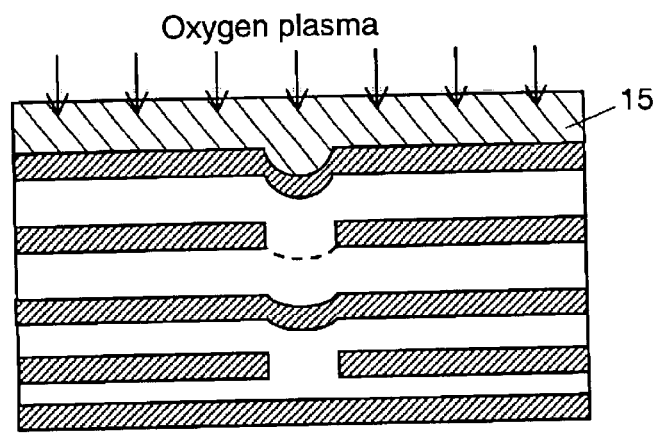
Figure 2C:
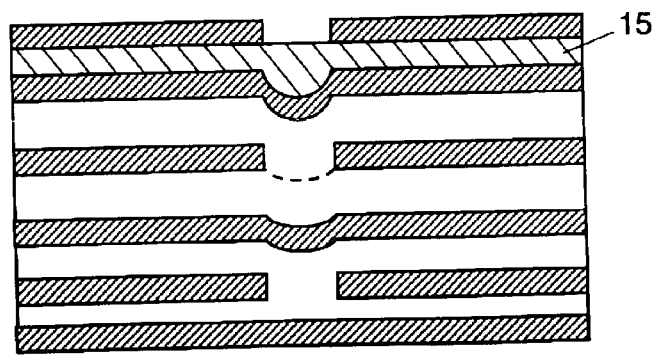

The manufacturing apparatus shown in FIG. 1 is used in exemplary embodiment 1. FIG. 2A to FIG. 2C show a manufacturing process of a multi-layer capacitor of the present invention. Degree of vacuum in vacuum chamber 5 is set at $2 \times 10^{-2}$ Pa. The outer peripheral surface of can roller 1 is kept at 5° C. Dicyclopentadiene dimethanol diacrylate is used as a reactive monomer forming dielectric material. This is vaporized by monomer evaporation source 2 and deposited onto the outer peripheral surface of can roller 1. As the reactive monomer, arbitrary material that is easily deposited and forms a good thin film after polymerization may be used. Polyfunctional acrylate, polyfunctional methacrylate, or polyfunctional vinyl ether is preferable.

Next, an electron-beam radiating device is used as curing unit 8, and cures deposited dielectric material. At this time, a thickness of a formed dielectric layer 12 is 0.1 $\mu$m. Resin surface treating unit 9 then applies an oxygen plasma treatment to a surface of dielectric layer 12. Patterning material supplying unit 3 supplies a patterning material to a part corresponding to electrical insulation parts 13. Fluorine-base oil is used as the patterning material. The patterning material is vaporized, jetted from a nozzle having a diameter of 50 $\mu$m, and adhered to the surface of dielectric layer 12 in a 150 $\mu$m-wide band shape. Metal deposition source 4 then deposits aluminum for forming internal electrode 11. Thickness of this deposited layer is 25 nm, and a surface resistance thereof is 6 $\Omega$/square. Metal electrode surface treating unit 7 then deposits titanium to a 0.1 nm thickness during a sputtering method. The operations discussed above are repeated 3000 times by rotating can roller 1. The process until now is called process A. FIG. 2A shows a state at completion of process A. Next, a procedure of flattening electrical insulation recessed part 14 is described. Electrical insulation recessed part 14 is shown by a broken line. Since the recessed part is formed of dielectric material, the broken line is used for distinguishing between the dielectric materials. Metal deposition source 4 is firstly partitioned by a shutter, and monomer evaporation source 2 and curing unit 8 form resin layer 15 by repeating lamination and curing about 500 to 1000 times. Monomer evaporation source 2 is then partitioned by a partition plate. Resin surface treating unit 9 etches resin layer 15 with oxygen plasma as shown in FIG. 2B. Electrical insulation recessed part 14 is thus filled to flatten a surface of the laminated body as shown in FIG. 2C. Repeating the operations discussed above forms a laminated body having a thickness of about 1.6 mm. An obtained cylindrical laminated body is then radially divided into twenty pieces and removed. A flat parent element of the laminated body is obtained by performing a hot pressing operation. This element is cut, and then forms a chip capacitor as a product in a process similar to that for a conventional film capacitor. This process includes installation of an external electrode, for example. This obtained chip capacitor has a thickness of 1.3 mm in a laminated direction, depth of 1.6 mm, and width of 3.2 mm (the direction between both external electrodes). This chip capacitor is small, but has 4.7 μF of capacity and 6.3 V of withstand voltage. The chip capacitor is mounted to a printed wiring board via solder. Any problem such as breakage of the laminated body or degradation of a capacitor characteristic does not occur.

(Exemplary Embodiment 2)

Figure 3A:
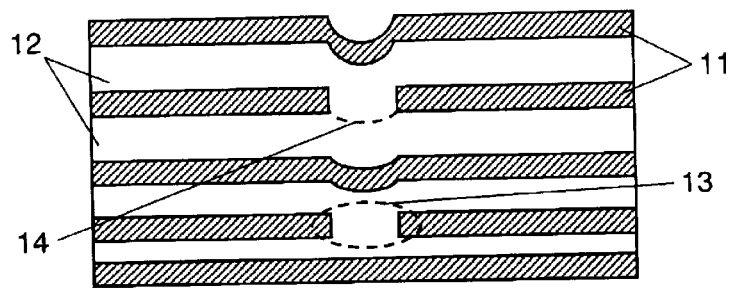
FIG. 3A to FIG. 3C show a manufacturing process in accordance with exemplary embodiment 2 of the present invention.
Figure 3B:
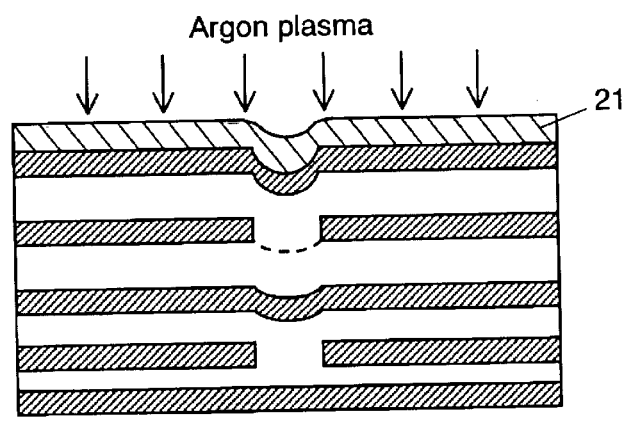
Figure 3C:
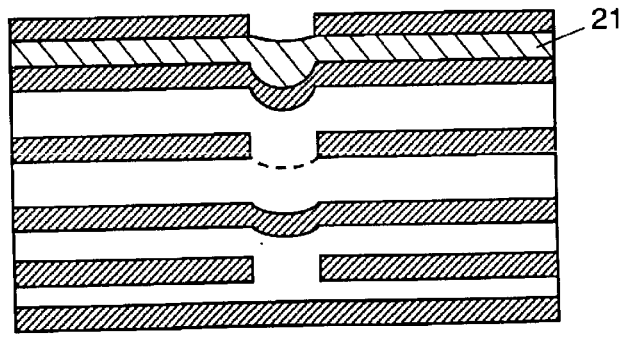

A capacitor of exemplary embodiment 2 is manufactured using the apparatus shown in FIG. 1 in the same method as that of exemplary embodiment 1 until process A is completed. FIG. 3A shows a state at completion of process A. A procedure of flattening electrical insulation recessed part 14 is described. Metal deposition source 4 is firstly partitioned by a shutter, and monomer evaporation source 2 and curing unit 8 form resin layer 21 by repeating lamination and curing about 500 to 1000 times. Monomer evaporation source 2 is then partitioned by a shutter, and resin surface treating unit 9 applies argon plasma to resin layer 21 as shown in FIG. 3B. At this time, a corner of a recessed part of resin layer 21 is firstly ground selectively, and finally resin layer 21 can fill the recessed part in its entirety. A surface of this laminated body can be flattened as shown in FIG. 3C. Argon is used as inert gas in the present embodiment; however, another inert gas such as xenon or neon may be used.

Repeating the operations discussed above forms a laminated body having a thickness of about 1.6 mm. A chip capacitor is obtained from the laminated body similarly to embodiment 1. This chip capacitor has a capacitor characteristic and solder heat resistance similar to those in embodiment 1.

(Exemplary Embodiment 3)

Figure 4A:
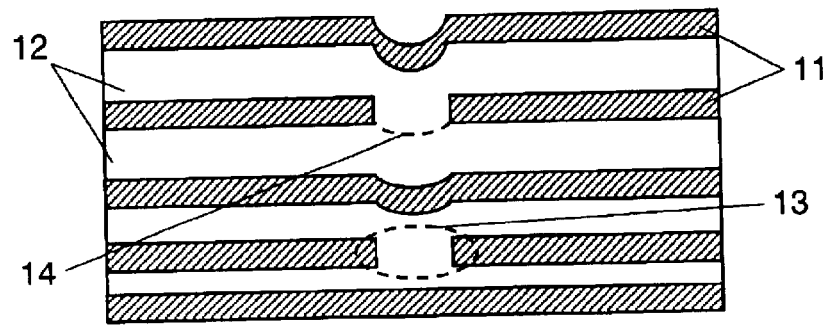
FIG. 4A to FIG. 4C show a manufacturing process in accordance with exemplary embodiment 3 of the present invention.
Figure 4B:
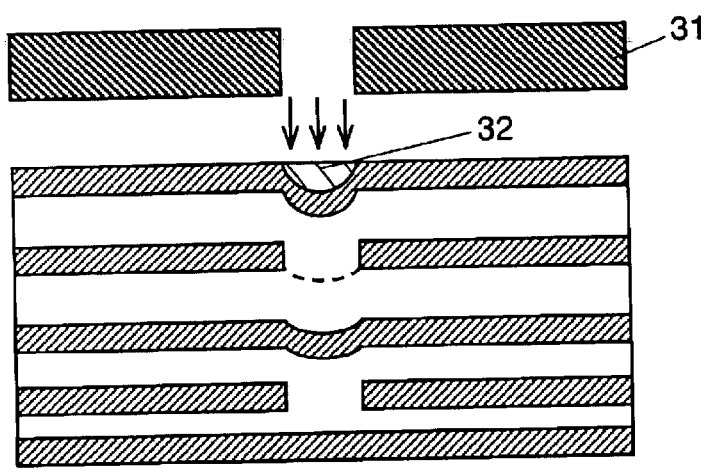
Figure 4C:
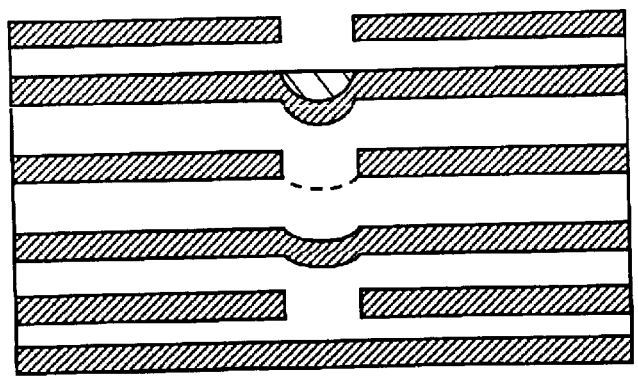
Figure 5:
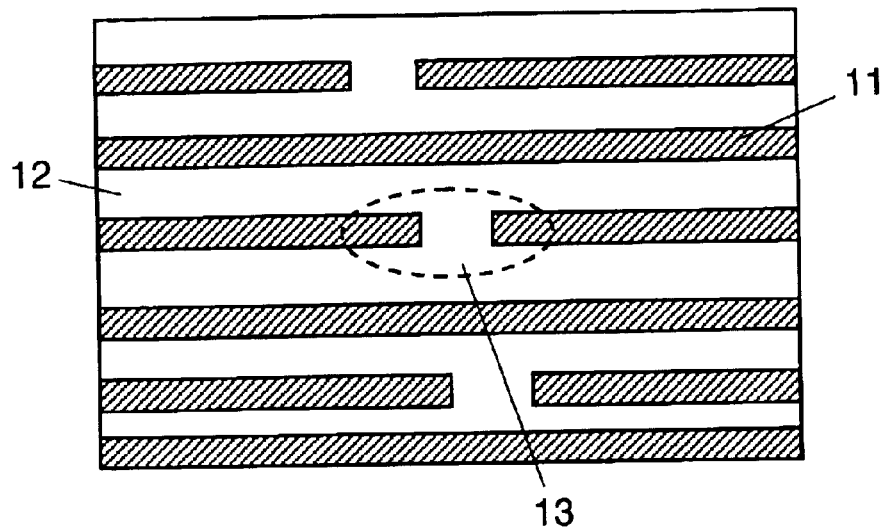
FIG. 5 is a sectional view illustrating a form having different laminating positions of the present invention.
Figure 6:
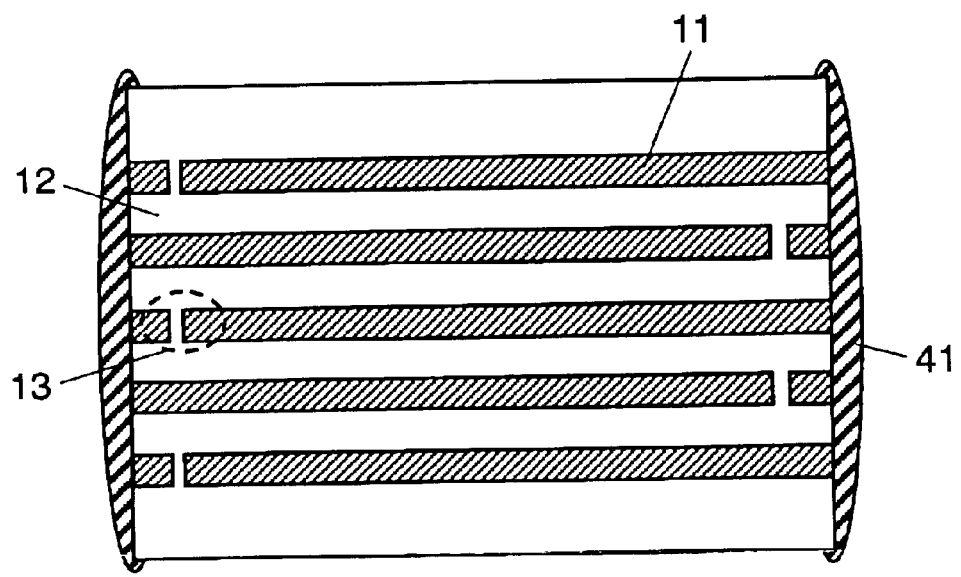
FIG. 6 is a sectional view illustrating a structure of a conventional multi-layer capacitor.
Figure 7:
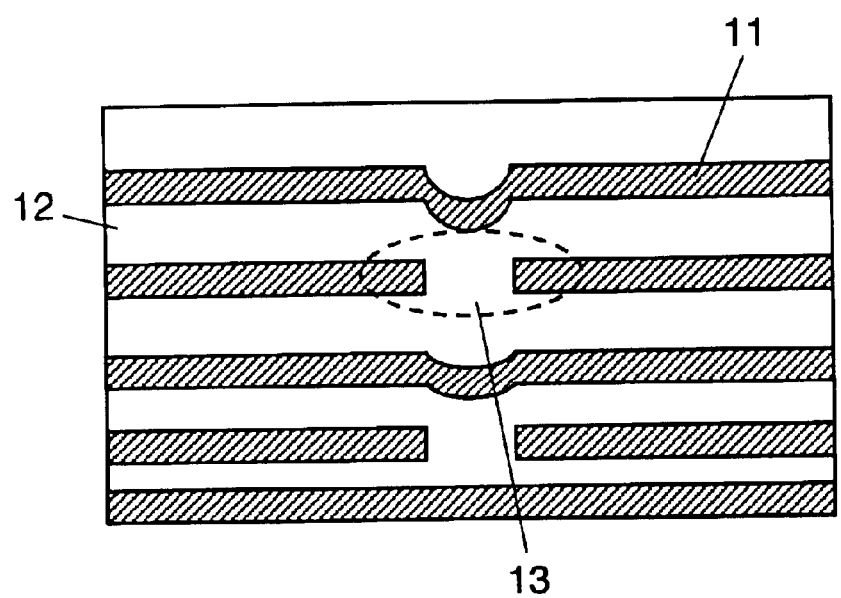
FIG. 7 is a sectional view illustrating an enlarged electrical insulation part of the conventional multi-layer capacitor.
Figure 8:
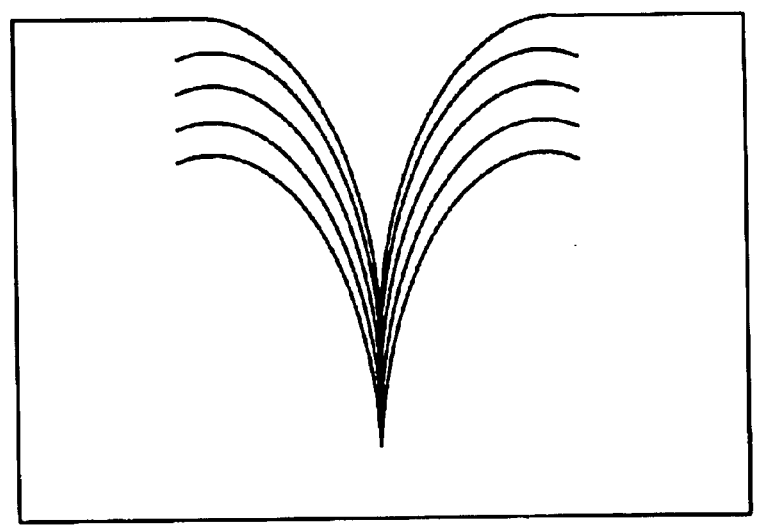
FIG. 8 is a perspective view illustrating an electrical insulation part of the conventional multi-layer capacitor.

A capacitor of exemplary embodiment 3 is manufactured using the apparatus shown in FIG. 1 in the same method as that of exemplary embodiment 1 until process A is completed. FIG. 4A shows a state at completion of process A. A procedure of flattening electrical insulation recessed part 14 is described. Monomer evaporation source 2 is firstly partitioned by a shutter, and metal deposition source 4 is partitioned by shutter 31 having a pattern part. Metal layer 32 is passed through the pattern part and laminated about 500 to 1000 times, as shown in FIG. 4B. Metal layer 32 fills the recessed part generated by the electrical insulation part and flattens a surface of the laminated body, as shown in FIG. 4C. Repeating the operations discussed above forms a laminated body of about 1.6 mm. A chip capacitor is obtained from the laminated body similarly to embodiment 1. This chip capacitor has a capacitor characteristic and solder heat resistance similar to those in embodiment 1. In embodiments 1 to 3, a laminating position of the electrical insulation part is the same as a laminating position of an electrical insulation part in an adjacent layer. However, it is preferable that laminating positions of the electrical insulation parts in adjacent layers do not overlap as shown in FIG. 5. More preferably, lamination is performed while periodically changing lamination positions. The laminating positions of the electrical insulation parts in the adjacent layers are set different from each other, thereby reducing unevenness generated by the electrical insulation parts. Thus, disconnection of an internal electrode and occurrence of a short circuit can be prevented. In embodiments 1 and 2, a thickly laminated dielectric layer is etched to flatten the surface of the laminated body. Another method such as laser ablation, namely a method of physically evaporating the surface of the laminated body, can be also used. A combination of these methods can be also used. A degree of flattening in the present invention is required to be simply enough to prevent disconnection of internal electrode 11 or a short circuit between layers from being caused by deep recessing of electrical insulation part 13. The present invention provides a manufacturing method allowing improvement of product yield of a small multi-layer capacitor having high capacity.

What is claimed is:

1. A method for manufacturing a multi-layer capacitor comprising:
   in the same vacuum chamber
   (a) depositing a monomer onto a rotating can roller so as to form a dielectric layer on a surface of said can roller;
   (b) supplying a patterning material onto a part of a surface of said dielectric layer so as to form an electrical insulation part;
   (c) depositing a metal onto said surface of said dielectric layer, but not onto said electrical insulation part, so as to form a metal electrode layer;
   (d) repeating (a), (b) and (c) so as to form a laminated body having a recessed part corresponding to the electrical insulation parts; and
   (e) flattening said recessed part,
   wherein depositing the monomer onto the rotating can roller comprises operating a shutter to open and close an opening through which said monomer passes from a monomer source, so as to control an interval of time during which said monomer is deposited onto said rotating can roller.

2. The method according to claim 1, wherein repeating (a), (b) and (c) so as to form the laminated body comprises repeating (a), (b) and (c) so as to form a cylindrical laminated body, and further comprising:
   dividing said cylindrical laminated body into individual segments;
   removing said individual segments from said can roller;
   hot pressing said individual segments so as to obtain flat laminated bodies; and
   cutting said flat laminated bodies into chip capacitors.

3. A method for manufacturing a multi-layer capacitor comprising:
   in the same vacuum chamber
   (a) depositing a monomer onto a rotating can roller so as to form a dielectric layer on a surface of said can roller;
   (b) supplying a patterning material onto a part of a surface of said dielectric layer so as to form an electrical insulation part;
   (c) depositing a metal onto said surface of said dielectric layer, but not onto said electrical insulation part, so as to form a metal electrode layer;
   (d) repeating (a), (b) and (c) so as to form a laminated body having a recessed part corresponding to the electrical insulation parts; and
   (e) flattening said recessed part,
   wherein depositing the metal onto said surface of said dielectric layer comprises operating a shutter to open and close an opening through which said metal passes from a metal source, so as to control an interval of time during which said metal is deposited onto said dielectric layer.

4. The method according to claim 3, wherein repeating (a), (b) and (c) so as to form the laminated body comprises repeating (a), (b) and (c) so as to form a cylindrical laminated body, and further comprising:

dividing said cylindrical laminated body into individual segments;

removing said individual segments from said can roller;

hot pressing said individual segments so as to obtain flat laminated bodies; and cutting said flat laminated bodies into chip capacitors.

5. A method for manufacturing a multi-layer capacitor comprising:

in the same vacuum chamber
  (a) depositing a monomer onto a rotating can roller so as to form a dielectric layer on a surface of said can roller;
  (b) supplying a patterning material onto a part of a surface of said dielectric layer so as to form an electrical insulation part;
  (c) depositing a metal onto said surface of said dielectric layer, but not onto said electrical insulation part, so as to form a metal electrode layer;
  (d) repeating (a), (b) and (c) so as to form a laminated body having a recessed part corresponding to the electrical insulation parts; and
  (e) flattening said recessed part;

depositing a reactive monomer onto said laminated body and then curing said reactive monomer so as to form a thin resin film on said laminated body; and activating said thin resin film by performing a surface treatment thereon, wherein activating said thin resin film by performing the surface treatment thereon comprises etching said thin resin film with oxygen plasma, and wherein flattening said recessed part comprises the etching of said thin resin film with oxygen plasma.

6. The method according to claim 5, wherein repeating (a), (b) and (c) so as to form the laminated body comprises repeating (a), (b) and (c) so as to form a cylindrical laminated body, and further comprising:

dividing said cylindrical laminated body into individual segments;

removing said individual segments from said can roller;

hot pressing said individual segments so as to obtain flat laminated bodies; and cutting said flat laminated bodies into chip capacitors.

7. A method for manufacturing a multi-layer capacitor comprising:

in the same vacuum chamber
  (a) depositing a monomer onto a rotating can roller so as to form a dielectric layer on a surface of said can roller;
  (b) supplying a patterning material onto a part of a surface of said dielectric layer so as to form an electrical insulation part;
  (c) depositing a metal onto said surface of said dielectric layer, but not onto said electrical insulation part, so as to form a metal electrode layer;
  (d) repeating (a), (b) and (c) so as to form a laminated body having a recessed part correspondings to the electrical insulation parts; and
  (e) flattening said recessed part, wherein flattening said recessed part comprises filling said recessed part by subjecting a thin resin film on said laminated body to plasma of a gas.

8. The method according to claim 7, wherein subjecting the thin resin film on said laminated body to plasma of the gas comprises subjecting said thin resin film to plasma of an oxygen gas.

9. The method according to claim 8, wherein repeating (a), (b) and (c) so as to form the laminated body comprises repeating (a), (b) and (c) so as to form a cylindrical laminated body, and further comprising:

dividing said cylindrical laminated body into individual segments;

removing said individual segments from said can roller;

hot pressing said individual segments so as to obtain flat laminated bodies; and cutting said flat laminated bodies into chip capacitors.

10. The method according to claim 7, wherein subjecting the thin resin film on said laminated body to plasma of the gas comprises subjecting said thin resin film to plasma of an inert gas.

11. The method according to claim 10, wherein subjecting said thin resin film to plasma of the inert gas comprises subjecting said thin resin film to plasma of at least one inert gas selected from the group consisting of argon, xenon and neon.

12. The method according to claim 11, wherein repeating (a), (b) and (c) so as to form the laminated body comprises repeating (a), (b) and (c) so as to form a cylindrical laminated body, and further comprising:

dividing said cylindrical laminated body into individual segments;

removing said individual segments from said can roller;

hot pressing said individual segments so as to obtain flat laminated bodies; and cutting said flat laminated bodies into chip capacitors.

13. The method according to claim 10, wherein repeating (a), (b) and (c) so as to form the laminated body comprises repeating (a), (b) and (c) so as to form a cylindrical laminated body, and further comprising:

dividing said cylindrical laminated body into individual segments;

removing said individual segments from said can roller;

hot pressing said individual segments so as to obtain flat laminated bodies; and cutting said flat laminated bodies into chip capacitors.

14. The method according to claim 7, wherein repeating (a), (b) and (c) so as to form the laminated body comprises repeating (a), (b) and (c) so as to form a cylindrical laminated body, and further comprising:

dividing said cylindrical laminated body into individual segments;

removing said individual segments from said can roller;

hot pressing said individual segments so as to obtain flat laminated bodies; and cutting said flat laminated bodies into chip capacitors.

15. A method for manufacturing a multi-layer capacitor comprising:

in the same vacuum chamber
  (a) depositing a monomer onto a rotating can roller so as to form a dielectric layer on a surface of said can roller;
  (b) supplying a patterning material onto a part of a surface of said dielectric layer so as to form an electrical insulation part;
  (c) depositing a metal onto said surface of said dielectric layer, but not onto said electrical insulation part, so as to form a metal electrode layer;

(d) repeating (a), (b) and (c) so as to form a laminated body having a recessed part corresponding to the electrical insulation parts; and (e) flattening said recessed part, wherein flattening said recessed part comprises filling said recessed part with metal that passes through a pattern part of a shutter positioned between said recessed part and a metal deposition source.

16. The method according to claim 15, wherein repeating (a), (b) and (c) so as to form the laminated body comprises repeating (a), (b) and (c) so as to form a cylindrical laminated body, and further comprising:

dividing said cylindrical laminated body into individual segments;

removing said individual segments from said can roller;

hot pressing said individual segments so as to obtain flat laminated bodies; and cutting said flat laminated bodies into chip capacitors.

* * * * *

UNITED STATES PATENT AND TRADEMARK OFFICE
CERTIFICATE OF CORRECTION

PATENT NO. : 6,918,165 B2 Page 1 of 1
APPLICATION NO. : 10/437295
DATED : July 19, 2005
INVENTOR(S) : Koji Arai et al.

It is certified that error appears in the above-identified patent and that said Letters Patent is hereby corrected as shown below:

<u>Claim 7</u>

In column 7, line 14, change "correspondings" to --corresponding--.

Signed and Sealed this

Sixth Day of March, 2007

JON W. DUDAS
*Director of the United States Patent and Trademark Office*